W. C. KEYS.
ROLLER BEARING CAGE.
APPLICATION FILED OCT. 31, 1919.
1,418,652.
Patented June 6, 1922.
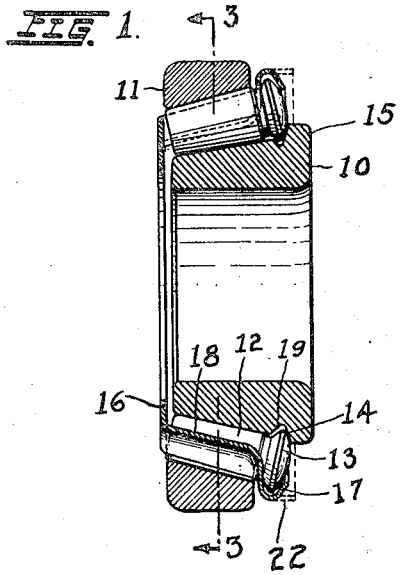
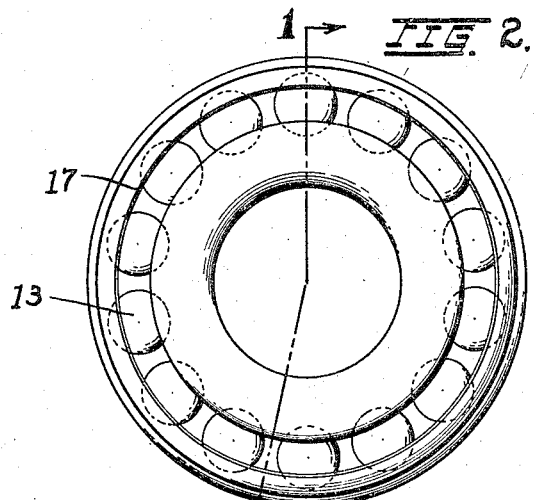
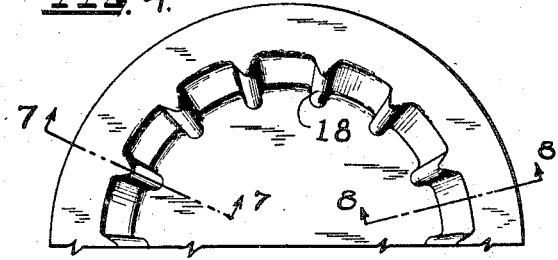
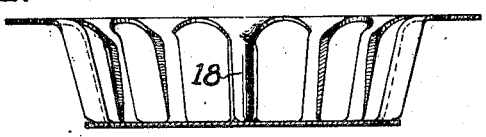
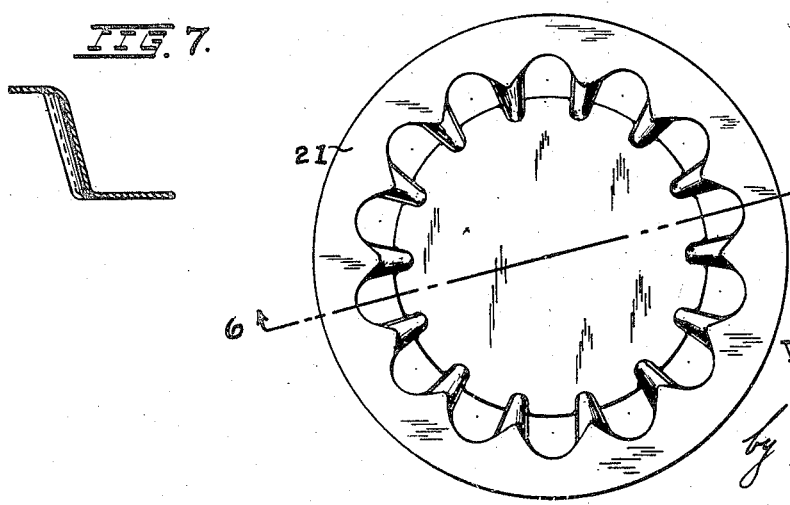
Inventor
WALTER C. KEYS.
Attorney

UNITED STATES PATENT OFFICE.

WALTER C. KEYS, OF CLEVELAND, OHIO, ASSIGNOR TO THE STANDARD PARTS COMPANY, OF CLEVELAND, OHIO, A CORPORATION OF OHIO.

ROLLER-BEARING CAGE.

1,418,652.  Specification of Letters Patent.  Patented June 6, 1922.

Application filed October 31, 1919. Serial No. 334,639.

*To all whom it may concern:*

Be it known that I, WALTER C. KEYS, a citizen of the United States, and a resident of Cleveland, county of Cuyahoga, State of Ohio, have invented certain new and useful Improvements in Roller-Bearing Cages, of which the following is a specification.

This invention relates to cages for roller bearings and especially to cages for taper roller bearings.

One of the objects of the invention is to provide a simple cage construction which may be formed from a single piece of sheet metal and which will be adapted to hold the rollers in permanently assembled relation with the inner race member of the bearing. Another object of the invention is to provide a cage of the type referred to which will be rigid and which may be economically manufactured.

Other objects and the features of novelty will be apparent from the following description, taken in connection with the accompanying drawings, of which:

Figure 1 is a longitudinal section through a bearing embodying my invention, the section being taken on the line 1—1 of Fig. 2;

Fig. 2 is a side elevation of the same;

Fig. 3 is a transverse section on the line 3—3 of Fig. 1;

Fig. 4 is a plan view of a fragment of the cage after the first operation in its construction;

Fig. 5 is a plan view of the cage after the second operation;

Fig. 6 is a transverse section on the line 6—6 of Fig. 5;

Fig. 7 is a section on the line 7—7 of Fig. 4; and

Fig. 8 is a section on the line 8—8 of Fig. 4.

Referring to the drawings, 10 indicates the bearing cone and 11 the cup, between which there is the usual series of rollers 12. The roller illustrated is provided with an enlarged head 13, which contacts, on its outer surface, with a conical surface 14 on the flange 15 of the cone 10, this bearing being well known to those skilled in the art as the Bock bearing.

This invention has particular reference to the cage which holds the rollers 12 in their proper spaced relation and permanently assembled with the cone 10. The cage consists of a radial flange 16 at the small end of the cone 10 and an inturned flange 17, the latter extending over the heads 13 of the rollers. The flanges 16 and 17 are connected by V-shaped or channel-shaped bridging members 18 between the rollers, which serve to circumferentially space the latter. It will be noted, from Figs. 1 and 3, that the channel of the bridging members 18 is formed in the exterior thereof and extends through the flange 16, thereby providing indentations in the outer edge of the latter and giving rigidity to the connection between the bridging members and the flange. The cone 10 has a groove 19 to receive the heads 13 of the rollers and, from Fig. 1, it will be noted that the cage serves to retain the heads in the groove 19 and thereby holds the rollers in permanently assembled relation with the cone.

The method of forming the cage from a single piece of sheet metal will now be described. A flat disc, of the proper diameter and thickness of metal, constitutes the blank from which the operations start, the first operation being to throw the blank into the cup form shown in Fig. 4, by means of suitable dies and a stamping press. It will be noted that the wall of the cup is corrugated, to form the bridging members 18. The next step is to form the openings between the bridging members, and this may be done by a punching operation, in the manner well known to those skilled in the art. The result of this operation produces the structure illustrated in Figs. 5 to 8. The next operation is to punch out the bottom of the cup thus formed, to provide the opening 20. By means of suitable dies and a stamping operation, the flange 21 on the cage, as illustrated in Fig. 5, is thrown to the position indicated in dotted lines at 22 in Fig. 1. The rollers and the cone 10 are then assembled with the cage and the flange 17 is thrown to the final position shown in full lines in Fig. 1. This may be done by a spinning operation or by a stamping operation, as will be well understood by those skilled in this art.

Having thus described my invention, what I claim is:

1. In a roller bearing, the combination of a cage having end flanges and bridging members connecting said flanges, rollers arranged between said flanges and spaced apart by said members, and each of said members being formed with an outwardly opening channel which extends through one of said flanges and thereby forms indentations in one edge thereof.

2. In a tapered roller bearing, the combination of a cage having end flanges and bridging members connecting with said flanges at their outer edges, rollers having enlarged heads at one end and arranged between said flanges and spaced apart by said members, an inner race member having a peripheral groove to receive said enlarged heads and retained thereby in assembled relation with said cage and rollers, and each of said bridging members being formed exteriorly with a longitudinal channel.

3. A roller bearing cage comprising end flanges and bridging members between the rollers connecting said flanges, said bridging members being of channel shape and the channel thereof extending through one of said flanges and forming indentations in the periphery thereof.

4. A one-piece tapered roller bearing cage comprising end flanges and spaced bridging members connecting with said flanges at their outer edges and formed exteriorly with longitudinal channels.

5. A roller bearing cage formed of a single piece of sheet metal and comprising circular end members and roller-spacing bridging members connecting said end members and each formed exteriorly with a longitudinal depression whereby the metal of the bridging member is projected inwardly from the plane of the points of connection of the bridging member with said end members and a substantially V-shaped cross-section is produced.

In testimony whereof I affix my signature.

WALTER C. KEYS.